United States Patent Office 3,786,106
Patented Jan. 15, 1974

3,786,106
CYCLOALKYLAROMATIC PRODUCTION
Ernest A. Zuech and Donald L. Crain, Bartlesville, Okla., assignors to Phillips Petroleum Company
No Drawing. Filed Oct. 4, 1972, Ser. No. 294,989
Int. Cl. C07c 5/12
U.S. Cl. 260—668 R       7 Claims

ABSTRACT OF THE DISCLOSURE

Cycloalkylaromatics are produced by the reaction of aromatics with cycloolefins over an active clay catalyst. In one embodiment cyclohexylbenzene is produced by the alkylation of benzene with cyclohexene over active clay catalysts such as Filtrol grade 71, Filtrol grade 62 and Filtrol grade 49 catalysts.

---

This invention relates to a novel process for the preparation of alkylated aromatics. In accordance with another aspect, this invention relates to the production of cycloalkylaromatics from aromatics and cycloolefins over an active clay catalyst. In accordance with a further aspect, this invention relates to the production of cyclohexylbenzene by the alkylation of benzene with cyclohexene over an active clay catalyst. In accordance with a further aspect, this invention relates to the production of cycloalkylaromatics from aromatics and cycloolefins over an active clay catalyst wherein the reaction is carried out at temperatures below about 400° F.

Methods are available in the art for the production of aryl naphthene. One method for producing aryl naphthene comprises the coupling of aromatic nuclei in the presence of molecular hydrogen to produce partially hydrogenated dimer derivatives of the aromatic reactants. For example, benzene is hydrodimerized at elevated temperatures to a mixture containing cyclohexylbenzene in the presence of various catalysts. Also, it is known to partially hydrogenate polycyclic aromatics such as biphenyl to cyclohexylbenzene. None of the prior art methods of producing cyclohexylbenzene, for example, have yet been proved for a stable continuous operation necessary for commercial exploitation. Problems therewith include high catalyst cost, catalyst stability and regeneration.

Cyclohexylbenzene is a compound of commercial importance and has principal utility as a solvent and plasticizer in the plastics, coatings and adhesives fields. It is also utilized as a penetrating agent. The high boiling point of cyclohexylbenzene together with a freezing point well below normal or room temperature render it highly suited for the purposes stated. It is also useful as an intermediate in the production of cyclohexene which in turn can be utilized for the production of adipic acid and caprolactam. It can also be converted in high yield to phenol and cyclohexanone by air oxidation or auto-oxidation with subsequent acid treatment.

This invention relates to a novel process for the production of cycloalkylaromatics from aromatics and cycloolefins over an active clay catalyst.

Accordingly, an object of this invention is to provide an efficient and economical process for the production of cycloalkylaromatics.

Another object of this invention is to provide a novel process for the preparation of higher alkylaromatic compounds in improved yields.

A further object of this invention is to provide an improved process for the production of cyclohexylbenzene.

Other objects and aspects as well as the several advantages of the invention will be apparent to one skilled in the art upon reading the specification and the appended claims.

In accordance with the present invention, cycloalkylaromatics are produced by the reaction of aromatics with cycloolefins over an active clay catalyst such as Filtrol grade 71, Filtrol grade 62 and Filtrol grade 49.

In a specific embodiment of the invention, cyclohexylbenzene is produced by the alkylation of benzene with cyclohexene over an active clay catalyst.

The aromatic feedstocks which are suitable for use in the present invention are aromatic hydrocarbons, i.e., monocyclic aromatic hydrocarbons and alkyl-substituted monocyclic aromatic hydrocarbons. The alkyl substituents preferred normally contain from 1 to 5 carbon atoms per substituent. Some specific examples of suitable aromatic compounds are benzene, toluene, the xylenes, ethylbenzene, and the like, and mixtures thereof. Benzene is a presently preferred aromatic reactant.

The olefinic portion of the feedstocks which are suitable for use in the present invention are cycloolefins having from, say, 5 to 10 carbon atoms per molecule. Some specific examples of these are cyclopentene, cyclohexene, cycloheptene, cyclooctene, cyclodecene, and the like, and mixtures thereof.

Diluents suitable for use in the present process include both straight and branched chain paraffinic hydrocarbons containing 5 to 10 carbon atoms such as pentane, hexane, heptane, octane, nonane, and decane, and mixtures thereof. Cyclic paraffinic hydrocarbons such as cyclohexane can also be used.

The invention is catalyzed by active clay catalysts. Catalysts which have been found suitable in the practice of the present invention include the so-called Filtrol clay materials. Other similar clays can also be used if desired. Presently preferred active clay catalysts include Filtrol grade 71, Filtrol grade 62, and Filtrol grade 49. A typical analysis of the preferred Filtrol grade 71 clay catalyst is as follows: 71.2% $SiO_2$, 16.5% $Al_2O_3$, 3.6% $Fe_2O_3$, 3.2% $MgO$, 2.6% $CaO$, 1.3% $SO_3$, 1.0% ($K_2O+Na_2O$) and 0.6% $TiO_2$ (analysis on a volatile free basis). The catalyst can be employed as pills in a fixed bed or can be used as a slurry or suspension. In the preparation of tablets it is advantageous to incorporate a small amount, preferably about 3 weight percent, graphite as a processing aid. It is desirable that the tablets have a crushing strength of 5 to 10 pounds.

The process is advantageously practiced under substantially anhydrous conditions in an inert atmosphere provided by nitrogen, hydrogen, methane, and the Group VIII–A elements (helium, neon, etc.).

The reaction can be carried out either batchwise or continuously and any convenient contacting mode can be used. Continuous operation using a fixed catalyst bed reactor is presently preferred.

Suitable parameters for the practice of the present invention are as follows:

|  | Suitable | Preferred |
|---|---|---|
| (a) Molar ratio of aromatic/cycloalkene | 1:1–30:1 | 3:1–15:1 |
| (b) Temperature,° C./° F | 100–180/212–356 | 115–160/239–320 |
| (c) Pressure, p.s.i.g | 0–2,000 | 100–1,000 |
| (d) LHSV | 0.1–20 | 1–10 |

After leaving the reaction zone the effluent can be collected and separated using any conventional and suitable means.

EXAMPLE I

A charge of 19.2 g. (30 ml.) of Filtrol Grade 62 extrudate was placed in a ½-inch pipe reactor and covered with 10 ml. of 4 mm. glass beads. The system was pressure checked and heated to 150° C. under 200 p.s.i.g. nitrogen with nitrogen purge. A total feed of 210 g. (2.7 moles) benzene and 22 g. (0.27 mole) cyclohexene was pumped into the reactor at a rate of 1 ml./min. Samples of reactor effluent were taken for glc analysis at time intervals shown in Table I. During the reaction period of 448 minutes, the average temperatures near the top of the catalyst bed and at the middle of the catalyst bed were, respectively, 154° C. and 172° C.

the top of the catalyst bed and at the middle of the catalyst bed were, respectively, 154° C. and 162° C.

TABLE II
Cyclohexylbenzene over Filtrol 71 powder

| | | Reactor effluent composition, wt. percent[1] | | | | |
|---|---|---|---|---|---|---|
| | Time on stream (min.) | Lighter than $C_6H_{10}$ | $C_6H_{10}$ | Unknown | $CH_3$-$\phi$-cyclohexyl | Cyclohexylbenzene |
| Run number: | | | | | | |
| 1 | 88 | 1.0 | 0.3 | 1.4 | 0.9 | 96.4 |
| 2 | 148 | 1.3 | Trace | 2.8 | 1.3 | 94.7 |
| 3 | 281 | 3.6 | 0.0 | 4.2 | 3.1 | 89.2 |

[1] Excluding benzene and heavies.

At the end of 281 minutes the reactor was drained, and the catalyst bed was left under 200 p.s.i.g. $N_2$.

EXAMPLE III

This run was carried out over the same catalyst bed as in Example II. The procedure of this run differed from that used in Example II in the following respects: (a) during the reaction period of 450 minutes, the average temperatures near the top of the catalyst bed and at the middle of the catalyst bed were, respectively, 130° C. and 141° C., (b) after 206 minutes on stream the initial charge of 210 g. (2.7 moles) benzene and 22 g. (0.27 mole) cyclohexene had been added and the feed rate was increased from 1 ml./min. to 2 ml./min. and an additional charge of benzene/cyclohexene (210 g./22 g.) was passed through the reactor. Samples of reactor effluent were taken for glc analysis at time intervals shown in Table III.

TABLE I
Cyclohexylbenzene process over Filtrol 62

| | | Reactor effluent composition, wt. percent[1] | | | | |
|---|---|---|---|---|---|---|
| | Time on stream (min.) | Lighter than $C_6H_{10}$ | $C_6H_{10}$ | Unknown | $CH$-$\phi$-cyclohexyl | Cyclohexylbenzene |
| Run number: | | | | | | |
| 1 | 60 | Trace | 41.2 | 3.1 | 0.7 | 55.0 |
| 2 | 120 | Trace | 13.2 | 2.5 | 1.3 | 83.0 |
| 3 | 216 | 0.4 | 6.2 | 1.6 | 1.6 | 90.2 |
| 4 | 268 | 0.6 | 4.2 | 1.6 | 1.3 | 92.3 |
| 5 | 328 | 0.6 | 3.4 | 2.2 | 1.6 | 92.0 |
| 6 | 448 | 0.6 | 5.5 | 2.0 | 1.1 | 90.8 |

EXAMPLE II

A charge of 18.8 g. (30 ml.) of Filtrol Grade 71 powder was placed in a ½-inch pipe reactor and covered with 10 ml. of 4 mm. glass beads. The system was pressure checked and heated to above 150° C. under 200 p.s.i.g. nitrogen with nitrogen purge. A total feed of 210 g. (2.7 moles) benzene and 22 g. (0.27 mole) cyclohexene was pumped into the reactor at a rate of 1 ml./min. Samples of reactor effluent were taken for glc analysis at time intervals shown in Table II. During the reaction period of 281 minutes, the average temperatures near

TABLE III
Cyclohexylbenzene process over Filtrol 71 powder

| | | Reactor effluent composition, wt. percent[1] | | | | |
|---|---|---|---|---|---|---|
| | Time on stream (min.) | Lighter than $C_6H_{10}$ | $C_6H_{10}$ | Unknown | $CH_3$-$\phi$-cyclohexyl | Cyclohexylbenzene |
| Run number: | | | | | | |
| 1 | 120 | 2.2 | 0.0 | 4.5 | 2.0 | 91.3 |
| 2 | 180 | 2.6 | 0.0 | 5.6 | 2.5 | 90.2 |
| 3 | 240 | 1.0 | 0.3 | 2.2 | 0.7 | 95.7 |
| 4 | 296 | 0.6 | 0.3 | 2.4 | 0.8 | 96.0 |
| 5 | 356 | 0.6 | 0.2 | 1.9 | 0.8 | 96.3 |
| 6 | 416 | 0.6 | 0.4 | 1.5 | 1.2 | 96.3 |
| 7 | 450 | 0.3 | 0.9 | 1.5 | 0.4 | 96.9 |
| 8 | (2) | 0.7 | 1.1 | 2.3 | 1.3 | 94.6 |

[1] Excluding benzene and heavies.
[2] Reactor was drained to obtain Run 8.

Runs 3–8 were combined, stripped of benzene, and distilled to give the following:

|  | G. |
|---|---|
| (1) 47° C. (20 mm.)—120° C. (120 mm.) | 2.7 |
| (2) 120° C. (20 mm.)—126° C. (20 mm.) | 37.9 |
| (3) 126° C. (20 mm.)—105° C. (5 mm.) | 4.3 |
| (4) Residue | 9.3 |
|  | 54.2 |

The 9.3 g. residue represents 17.2% heavies.

A total feed of 210 g. (2.7 moles) benzene and 22 g. (0.27 mole) cyclohexene was pumped into the reactor at a rate of 1 ml./min. Samples of reactor effluent were taken for glc analysis at time intervals shown in Table V. During the reaction period of 443 minutes, the average temperatures near the top of the catalyst bed and at the middle of the catalyst bed were, respectively, 149° C. and 161° C.

glass beads. The system was pressure checked and heated to 150° C. under 200 p.s.i.g. nitrogen with nitrogen purge.

TABLE V

Cyclohexylbenzene process over Filtrol Grade 71 tablets

| | | Reactor effluent composition, wt. percent[1] | | | |
|---|---|---|---|---|---|
| | Time on stream (min.) | Lighter than $C_6H_{10}$ | $C_6H_{10}$ | Unknown | CH₃—φ (methylcyclopentylbenzene) | Cyclohexylbenzene |

| Run number: | | | | | | |
|---|---|---|---|---|---|---|
| 1 | 60 | Trace | 28.1 | 2.2 | 0.7 | 69.0 |
| 2 | 120 | 0.2 | 12.1 | 1.8 | 1.8 | 84.2 |
| 3 | 180 | 0.3 | 8.9 | 1.0 | 1.3 | 88.5 |
| 4 | 248 | 0.3 | 5.3 | 0.8 | 1.3 | 92.5 |
| 5 | 323 | 0.2 | 3.3 | 0.8 | 1.5 | 94.3 |
| 6 | 383 | 0.3 | 3.7 | 0.6 | 1.1 | 94.2 |
| 7 | 443 | 0.5 | 3.9 | 0.6 | 1.6 | 93.4 |
| 8 | (²) | 0.4 | 5.0 | 0.9 | 1.9 | 91.7 |

[1] Excluding benzene and heavies.
² Run 8 was obtained by draining the reactor.

EXAMPLE IV

A continuous tube reactor of ½-inch pipe was charged with 30 ml. (31.6 g.) Filtrol Grade 71 tablets (20 p.s.i. average crushing strength) and 10 ml. of 4 mm. glass beads were placed on top of the tablets. The system was pressure checked and heated to 150° C. under 200 p.s.i.g. nitrogen with nitrogen purge. A total feed of 420 g. (5.4 moles) benzene and 44 g. (0.54 mole) cyclohexene was pumped into the reactor at a rate of 1 ml./min. During the addition of the initial benzene/cyclohexene charge (210 g./22 g.) over a period of 250 minutes, the average temperatures near the top of the catalyst bed and at the middle of the catalyst bed were, respectively, 147° C. and 158° C. The temperature was adjusted during the addition of the final benzene/cyclohexene charge (210 g./22 g.) so that the average temperatures near the top of the catalyst bed and at the middle of the catalyst bed were, respectively, 174° C. and 189° C. for the final 150 minutes of reaction time. Samples of reactor effluent were taken for glc analysis at time intervals shown in Table IV.

The product mixture was stripped of volatiles and distilled to give the following:

|  | G. |
|---|---|
| (1) 85° C. (20 mm.)—123° C. (20 mm.) | 4.7 |
| (2) 123° C. (20 mm.)—144° C. (20 mm.) | 39.6 |
| (3) 144° C. (20 mm.)—132° C. (5 mm.) | 2.3 |
| (4) Residue | 8.5 |
|  | 55.1 |

The 8.5 g. residue represents 15.4% heavies.

EXAMPLE VI

A ½-inch pipe reactor was charged with 30 ml. (27.8 g.) Zeolon H catalyst and the catalyst was covered with 10 ml. of 4 mm. glass beads. The system was pressure checked and heated to 150° C. under 200 p.s.i.g. nitrogen with nitrogen purge. A total feed of 210 g. (2.7 moles) benzene and 22 g. (0.27 mole) cyclohexene was pumped into the reactor at a rate of 1 ml./min. Samples of reactor effluent were taken for glc analysis at time intervals

TABLE IV

Cyclohexylbenzene process over Filtrol Grade 71 tablets

| | | Reactor effluent composition, wt. percent[1] | | | |
|---|---|---|---|---|---|
| | Time on stream (min.) | Lighter than $C_6H_{10}$ | $C_6H_{10}$ | Unknown | CH₃—φ | Cyclohexylbenzene |

| Run number: | | | | | | |
|---|---|---|---|---|---|---|
| 1 | 60 | Trace | 52.4 | 4.9 | Trace | 42.7 |
| 2 | 120 | Trace | 24.4 | 5.2 | 1.0 | 69.3 |
| 3 | 180 | 0.2 | 13.1 | 1.7 | 1.2 | 83.8 |
| 4 | 250 | 0.3 | 8.6 | 1.0 | 1.0 | 89.1 |
| 5 | 315 | 0.3 | 5.2 | 0.8 | 0.9 | 92.8 |
| 6 | 375 | 0.5 | 2.5 | 1.0 | 2.0 | 94.0 |
| 7 | 435 | 0.5 | 1.5 | 0.9 | 1.9 | 95.2 |
| 8 | 465 | 0.9 | 1.1 | 0.6 | 1.8 | 95.6 |

[1] Excluding benzene.
NOTE.—Heavies were not determined in this run.

EXAMPLE V

A charge of 28.0 g. (30 ml.) of Filtrol Grade 71 tablets (10 p.s.i. average crushing strength) was placed in a ½-inch pipe reactor and covered with 10 ml. of 4 mm.

shown in Table VI. During the reaction period of 260 minutes, the average temperatures near the top of the catalyst bed and at the middle of the catalyst bed were, respectively, 150° C. and 177° C.

TABLE VI
Cyclohexylbenzene process over Zeolon H catalyst

| Run no.: | Time on stream (min.) | Reactor effluent composition, wt. percent [1] | | |
|---|---|---|---|---|
| | | $C_6H_{10}$ | Unknown | Cyclohexylbenzene |
| 1 | 60 | 72.5 | 2.9 | 24.6 |
| 2 | 120 | 57.7 | 3.1 | 29.3 |
| 3 | 180 | 55.1 | 7.5 | 37.4 |
| 4 | 260 | 64.7 | 8.1 | 27.2 |

[1] Excluding benzene.

The conversion of cyclohexene was lower over the Zeolon H catalyst as shown by the weight percent of cyclohexene in the reactor effluent.

Zeolon H is a synthetic material supplied by Norton Chemical Co. Zeolon H is a hydrated alkali metal-aluminum silicate in which approximately 33 percent of the alkali metal ions have been exchanged for hydrogen ions.

EXAMPLE VII

A charge of 25.7 g. (30 ml.) of Filtrol Grade 71 tablets (5 p.s.i. average crushing strength) was placed in a ½-inch pipe reactor bedded with 15 ml. of 3 mm. glass beads and the tablets were covered with 25 ml. of 4 mm. glass beads. The system was pressure checked and heated to 200° C. under 500 p.s.i.g. nitrogen with nitrogen purge. A total feed of 210 g. (2.7 moles) benzene and 22 g. (0.27 mole) cyclohexene was pumped into the reactor at a rate of 1 ml./min. Samples of reactor effluent were taken for glc analysis at time intervals shown in Table VII. During the reaction period of 418 minutes, the temperature of the catalyst bed was approximately 200° C.

TABLE VII
Cyclohexylbenzene process over Filtrol Grade 71 tablets

| | | Reactor effluent composition, wt. percent [1] | | | | |
|---|---|---|---|---|---|---|
| Run number: | Time on stream (min.) | Lighter than $C_6H_{10}$ | $C_6H_{10}$ | Unknown | $CH_3$—φ (methylcyclopentylbenzene) | Cyclohexylbenzene |
| 1 | 70 | 0.8 | 5.7 | 2.0 | 2.5 | 88.8 |
| 2 | 188 | 1.4 | 0.3 | 0.9 | 3.0 | 93.2 |
| 3 | 268 | 4.8 | Trace | 2.2 | 5.7 | 84.9 |
| 4 | 328 | 7.5 | Trace | 2.9 | 7.5 | 79.6 |
| 5 | 390 | 6.7 | Trace | 3.0 | 7.0 | 82.6 |
| 6 | 418 | 6.4 | Trace | 3.1 | 7.6 | 81.2 |

[1] Excluding benzene and heavies.

The reactor was drained and the material so obtained was combined with Runs 1–6 for distillation. Volatiles were removed on a rotary evaporator and distillation of the residue gave the following:

| | G. |
|---|---|
| (1) 118° C. (20 mm.)—120° C. (20 mm.) | 4.3 |
| (2) 120° C. (20 mm.)—134° C. (20 mm.) | 22.5 |
| (3) 134° C. (20 mm.)—134° C. (5 mm.) | 1.2 |
| (4) Residue | 6.5 |
| | 34.5 |

The 6.5 g. residue represents 18.8 percent heavies.

Additional experimental runs were carried out in the same manner as described in Examples I–VII; the results of these runs are summarized in Table VIII.

TABLE VIII
Cyclohexylbenzene process over Filtrol Grade 71 tablets

| Run No. | Temp., °C. | $N_2$ pressure, p.s.i.g. | LHSV | Reactor effluent composition, wt. percent [1] | | | | | | Molar ratio $C_6H_6/C_6H_{10}$ |
|---|---|---|---|---|---|---|---|---|---|---|
| | | | | Lights | $C_6H_{10}$ | Unknown | MeCpBz [2] | CyBz [2] | Heavies | |
| 1 | 150 | 200 | 2 | 0.8 | 0.6 | 0.6 | 1.3 | 81.8 | 14.9 | 10/1 |
| 2 | 125 | 200 | 2 | 0.3 | 2.9 | 0.6 | 1.0 | 82.3 | 12.8 | 10/1 |
| 3 | 125 | 500 | 2 | 0.4 | 3.2 | 0.4 | 0.8 | 84.1 | 11.2 | 10/1 |
| 4 | 125 | 500 | 1.5 | 0.3 | 2.0 | 0.3 | 0.9 | 83.8 | 12.5 | 10/1 |
| 5 | 125 | 500 | 3 | 0.4 | 8.6 | 0.5 | 0.7 | 83.3 | 6.4 | 10/1 |
| 6 | 125 | 500 | 2 | 0.3 | 10.7 | 1.3 | 0.5 | 71.6 | 15.6 | 5/1 |
| 7 | 150 | 500 | 2 | 0.9 | 2.0 | 0.7 | 1.3 | 77.1 | 17.9 | 5/1 |
| 8 [3] | 150 | 500 | 2 | Trace | 1.1 | 0.6 | 1.7 | 84.1 | 12.5 | 10/1 |

[1] Product percentages were normalized excluding benzene.
[2] MeCpBz and CyBz represent, respectively, methylcyclopentylbenzene and cyclohexylbenzene.
[3] Diluent of cyclohexane was used.

The chemical analyses of Filtrol 49 and Filtrol 62 are identical as shown below:

| Component [1] | Wt. percent [2] |
|---|---|
| $SiO_2$ | 74.0 |
| $Al_2O_3$ | 17.5 |
| MgO | 4.5 |
| $Fe_2O_3$ | 1.4 |

[1] Analytical data provided by supplier.
[2] Total 97.4%, balance not specified by Filtrol Corp. The above analyses were determined by the supplier after heating the Filtrols at 1700° F. In this heat treatment Filtrols 49 and 62 lost, respectively, 17 percent and 5 percent volatiles.

We claim:
1. A process for the production of cycloalkylaromatics which comprises contacting a monocyclic aromatic hydrocarbon or alkyl-substituted monocyclic aromatic hydrocarbon with a cycloolefin in an inert atmosphere in the presence of an active clay catalyst under reaction conditions of temperature which produce cycloalkylaromatics.

2. A process according to claim 1 wherein the reaction temperature is in the range 100–180° C. and the contacting is carried out under liquid phase condition.

3. A process according to claim 2 wherein a molar excess of aromatic hydrocarbon is employed.

4. A process according to claim 1 wherein cyclohexylbenzene is produced by contacting benzene with cyclohexene at a temperature in the range 100–180° C.

5. A process according to claim 4 wherein excess benzene in the effluent from said contacting is recovered and recycled to said contacting.

6. A process according to claim 4 wherein a liquid phase of benzene and cyclohexene is passed through a bed of Filtrol Grade 71 active clay catalyst at a liquid hourly space velocity (LHSV) in the range of 0.1–20.

7. A process according to claim 4 wherein a liquid phase of benzene and cyclohexene is passed through a bed of Filtrol Grade 62 active clay catalyst at a liquid hourly space velocity (LHSV) in the range of 0.1–20.

References Cited

UNITED STATES PATENTS

| | | | |
|---|---|---|---|
| 2,853,533 | 9/1958 | Weaver | 260—671 R |
| 2,930,820 | 3/1960 | Aries | 260—671 C |
| 2,932,676 | 4/1960 | Camp et al. | 260—674 SH |
| 3,153,678 | 10/1964 | Logemann | 260—667 |
| 3,317,611 | 5/1967 | Louvar et al. | 260—668 F |
| 3,409,684 | 11/1968 | Aristoff et al. | 260—667 |
| 3,412,165 | 11/1968 | Slaugh et al. | 260—668 R |

CURTIS R. DAVIS, Primary Examiner

U.S. Cl. X.R.

260—667